Patented Mar. 28, 1950

2,502,191

UNITED STATES PATENT OFFICE 2,502,191

METHOD OF PREVENTING LOSS OF LIQUID FROM A WELL HOLE IN THE EARTH

Guy F. Williams, Tulsa, Okla., assignor to The Dow Chemical Company, Midland, Mich., a corporation of Delaware No Drawing. Application October 31, 1945, Serial No. 625,941

1 Claim. (Cl. 252—8.55)

The invention relates to methods of reducing or preventing the loss, from the bore of a well into the surrounding earth, of a liquid or fluid material. It more particularly concerns preventing or reducing the loss of drilling fluids and other aqueous or non-aqueous liquids employed in drilling, operating, or treating wells in the earth.

The problem of preventing or reducing the loss of a fluid from the bore of an earth well into the surrounding earth arises in a number of different ways as, for example, in drilling in which a liquid is circulated into and out of the well bore for the removal of the cuttings made by the drill, to maintain hydrostatic pressure on the earth formations, and to reinforce the well hole wall; in cementing in which a fluid cement is introduced into the bore under pressure behind a casing; and in chemical treatment in which a liquid agent is injected into some formations while being excluded from others as by fluid blankets. One way of attempting to solve the problem has been to incorporate in the fluid, the loss of which is to be prevented, various comminuted solids which filter out of the fluid as it passes from the well hole into the surrounding earth, thereby forming on the face of the formation a filter cake which hinders the passage of fluid therethrough the more the thicker the cake becomes. However, many difficulties inure to such practice among which may be cited the following: It is difficult to maintain conventional solid filter cake forming materials in proper suspension in well fluids due in part to the divergence of the specific gravity of the material and that of the fluid in which the material is used. Relatively heavy materials tend to settle out of liquid suspensions so that effective distribution of the material in the fluid involved is not readily maintained. Wettability, I have found, is also a factor in that conventional materials either are difficult to wet or if wet lose their strength and effectiveness. In some instances, the individual particles of the material tend to agglomerate and thereby militate against its usefulness. Agglomeration of the particles is particularly disadvantageous when the material is to be circulated through pumps, drill bits, float screens, etc. without producing plugging. The fluids thus involved may be homogeneous liquids as in the case of many synthetic resin-forming cementing liquids and chemical well treating solutions (e. g. hydrochloric acid) or heterogeneous fluids as in drilling muds, Portland cement slurries, jellifying mixtures and the like which are composed of comminuted solid or semi-solid materials suspended in a liquid medium, usually water. In all such operations, it becomes necessary, if not desirable, to so control the fluid adjacent to the wall of the well hole that unnecessary and unwanted penetration of the fluid into the earth is prevented or appropriately reduced or retarded.

Accordingly, it is an object of the invention to provide an improved method of preventing or reducing the passage of a fluid agent from the well hole into the adjacent earth formation. A particular object is to provide a method of preventing or restraining the passage of a drilling fluid from a well hole into the adjacent earth. Another particular object is to prevent or restrain the passage of a fluid cement into the earth. Still other objects and advantages will appear as the description of the invention proceeds.

In accordance with the invention, I have discovered that by including in the fluid, the loss of which through the earth formation is to be reduced or prevented, about 0.1 to 2 per cent by weight of fragmented vesiculated polystyrene, the greatest dimension of the individual particles of which is from $\frac{1}{32}$ of an inch to $\frac{3}{8}$ of an inch, very desirable results are achieved. For example, the material is of lighter weight than hitherto employed materials, and thus is more readily dispersed in aqueous and like media. It is also more easily wettable by water, thereby further enhancing its dispersibility in usual aqueous fluids employed in well operations. Yet, in spite of its greater wettability, it does not absorb a significant amount of water so that its strength is unimpaired in use. Fragmented vesiculated polystyrene has the further advantage in that its individual particles readily disperse in fluid media, particularly aqueous liquids, thereby reducing or avoiding the difficulty exhibited by conventional materials of clogging the passages through pumps, drill bits, mud screens, and the like by agglomerating.

The particles of fragmented vesiculated polystyrene, as used in accordance with the invention, are unique as to form in that they are composed of the fragmented cells of a vesiculated rigid mass of polystyrene. A conventional way of producing a vesiculated mass of polystyrene, which by fragmentation yields the material for use in accordance with the invention, is described in U. S. Patent No. 2,023,204. According to this patent, a quantity of polystyrene is mixed with a normally gaseous agent soluble in polystyrene, the mixing taking place in a closed vessel under pressure and at a temperature near the melting point to form a more or less semi-solid or gelled mixture. A suitable normally gaseous agent for the purpose is methyl chloride. The mixture is then submitted to quick expansion as by discharging it from the bottom of the mixing vessel through a valve into the atmosphere. As the pressure is thus released, the gelled mixture expands into a mass of bubbles or foam which cools as it forms becoming a vesiculated rigid mass. This rigid foam or vesiculated mass comprises more or less uniform sized closed hollow cells, the walls of which are formed of four or more substantially plane membranes of polystyrene between about 0.1 and 0.001 millimeter in thickness intersecting at various angles, the membranes being ridged or thickened at the intersections. I have found that by fragmenting such a vesiculated mass, as by moving the mass against rotating milling cutters or otherwise comminuting the vesiculated mass, fragments are obtained which are unique as to form and action in well fluids. In form, the fragments comprise the ridged junctions and the vestages of the adjacent substantially plane walls of the cells, the greatest dimension of each fragment not exceeding between about $\frac{1}{32}$ of an inch and $\frac{3}{8}$ of an inch. The combination of the varied directions of the vestages of the intersecting walls of each fragment of the comminuted mass and the stiffening ridge of the junction of the vestages of the walls, the thin flexible nature of the vestages of the walls adjoining the ridges, their ready wettability, light weight, high wet strength, and imperviousness to aqueous well fluids give rise to new and unique effects and ease and economy of use in preventing and restraining the loss of fluid from well holes.

In applying the method I have found a most advantageous way is to incorporate the comminuted material in the fluid, the loss of which is to be prevented or reduced, in an amount between about 0.1 to 2 per cent by weight of the fluid involved. This may be accomplished either in the well if the fluid concerned is there already or by adding it to the fluid before its introduction into the well. The material may be introduced into the well alone, or, if desired, washed in as by running a stream of water into the well and adding the material to the water as it flows into the well. In some instances, as in drilling a well wherein a drilling fluid is circulated from a pit through a circulating pump and drill pipe to the well, the material may be introduced advantageously into the drilling fluid pit near the suction inlet of the pump. In such mode of introduction, the material is preferably mixed with the fluid in the pit in the vicinity of the pump suction. In such uses, the material is mixed with the resin-forming liquid preferably before introducing the mixture into the well.

The material thus incorporated in the fluid involved renders it retainable by the well in spite of the normal permeability of the earth formations to fluids. When using the amount of material herein indicated a relatively small amount of fluid initially penetrates the earth formation which filters out the fragmented vesiculated polystyrene from the fluid thereby forming a cake of the fragmented material on the hole wall at the site of the initial penetration of fluid. As the cake forms, it quickly becomes impervious to fluid and further penetration of fluid through it into the surrounding formation is substantially prevented.

I claim:

The method of restraining the passage of drilling mud from a well hole through the wall thereof into the surrounding earth formation which comprises introducing into the well and intermixing with the drilling mud, the passage of which from the well hole through the wall thereof is to be restrained, particles of fragmented vesiculated polystyrene, the greatest dimensions of the individual particles of which are between $\frac{1}{32}$ and $\frac{3}{8}$ of an inch in amount between about 0.1 and 2 per cent of the weight of the drilling mud.

GUY F. WILLIAMS.

REFERENCES CITED

The following references are of record in the file of this patent:

UNITED STATES PATENTS

| Number | Name | Date |
| --- | --- | --- |
| 2,023,204 | Munters et al. | Dec. 3, 1935 |
| 2,211,429 | Mueller-Cunradi | Aug. 13, 1940 |
| 2,353,372 | Stone | July 11, 1944 |